United States Patent
Baer et al.

(10) Patent No.: US 10,657,116 B2
(45) Date of Patent: May 19, 2020

(54) CREATE TABLE FOR EXCHANGE

(71) Applicant: Oracle International Corporation, Redwood Shores, CA (US)

(72) Inventors: Hermann Baer, San Mateo, CA (US); Ramesh Kumar, Foster City, CA (US); Ananth Raghavan, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 202 days.

(21) Appl. No.: 15/228,831

(22) Filed: Aug. 4, 2016

(65) Prior Publication Data
US 2017/0109386 A1   Apr. 20, 2017

Related U.S. Application Data

(60) Provisional application No. 62/243,346, filed on Oct. 19, 2015.

(51) Int. Cl.
*G06F 17/30* (2006.01)
*G06F 16/22* (2019.01)
*G06F 16/2455* (2019.01)

(52) U.S. Cl.
CPC .... *G06F 16/2282* (2019.01); *G06F 16/24554* (2019.01)

(58) Field of Classification Search
USPC ........................................................ 707/803
See application file for complete search history.

(56) References Cited

U.S. PATENT DOCUMENTS

| | | | |
|---|---|---|---|
| 7,031,987 B2 | 4/2006 | Mukkamalla et al. | |
| 7,571,173 B2 | 8/2009 | Yang et al. | |
| 8,554,806 B2 | 10/2013 | Hu et al. | |
| 9,003,109 B1 * | 4/2015 | Lam | G06F 3/0688 711/103 |
| 2004/0002996 A1 | 1/2004 | Bischof | |
| 2005/0038831 A1 | 2/2005 | Souder | |
| 2005/0187897 A1 | 8/2005 | Pawar et al. | |

(Continued)

OTHER PUBLICATIONS

Kumar, Gauraw: "Learning About Exchange Partition Mechanism—Oracle", dated Feb. 22, 2015, 8 pages.

(Continued)

*Primary Examiner* — Hung T Vy
(74) *Attorney, Agent, or Firm* — Hickman Palermo Becker Bingham LLLP

(57) ABSTRACT

Techniques are described herein for creating a new database table for an exchange operation with a table partition of another table. A database management system (DBMS) is configured to receive a query such as "CREATE TABLE new_table FOR EXCHANGE FROM partition_P1". The DBMS then identifies properties of the source partition (e.g., partition P1) and creates a new database table based on the properties identified. Some of these properties (e.g., hidden columns, data modeling frameworks, and table statistics) may not otherwise be directly accessible by the external entity that sent the query. The newly created table then has all of the necessary properties to be part of the other table if swapped with the source partition in an exchange operation.

21 Claims, 13 Drawing Sheets

(56) References Cited

U.S. PATENT DOCUMENTS

| | | | |
|---|---|---|---|
| 2006/0123009 A1* | 6/2006 | Bruno | G06F 16/2462 |
| 2006/0179116 A1 | 8/2006 | Speeter | |
| 2006/0206507 A1* | 9/2006 | Dahbour | G06F 17/30604 |
| 2008/0162491 A1 | 7/2008 | Becker | |
| 2009/0204570 A1* | 8/2009 | Wong | G06F 17/30451 |
| 2010/0036788 A1* | 2/2010 | Wu | G06F 17/30286 |
| | | | 706/47 |
| 2013/0132349 A1 | 5/2013 | Hahn | |
| 2013/0290506 A1 | 10/2013 | Astete | |
| 2014/0095530 A1 | 4/2014 | Lee | |
| 2014/0304229 A1* | 10/2014 | Zhu | G06F 16/27 |
| | | | 707/634 |
| 2015/0347401 A1* | 12/2015 | Raghavan | G06F 17/303 |
| | | | 707/809 |
| 2015/0363435 A1* | 12/2015 | Ott | G06F 17/30294 |
| | | | 707/803 |
| 2017/0116235 A1 | 4/2017 | Yam | |

OTHER PUBLICATIONS

Oracle, "White Paper for Oracle Multitenant", dated Jun. 2013, 53 pages.
Yam, U.S. Appl. No. 15/266,030, filed Sep. 15, 2016, Office Action, dated Feb. 26, 2019.
Sartain, JD, "Max Productivity", dated Feb. 17, 2015, 8 pages.
Sartain, JD, "5 Must-know Excel Macros for Common Tasks", dated Sep. 10, 2014, 12 pages.

* cited by examiner

System Architecture 100

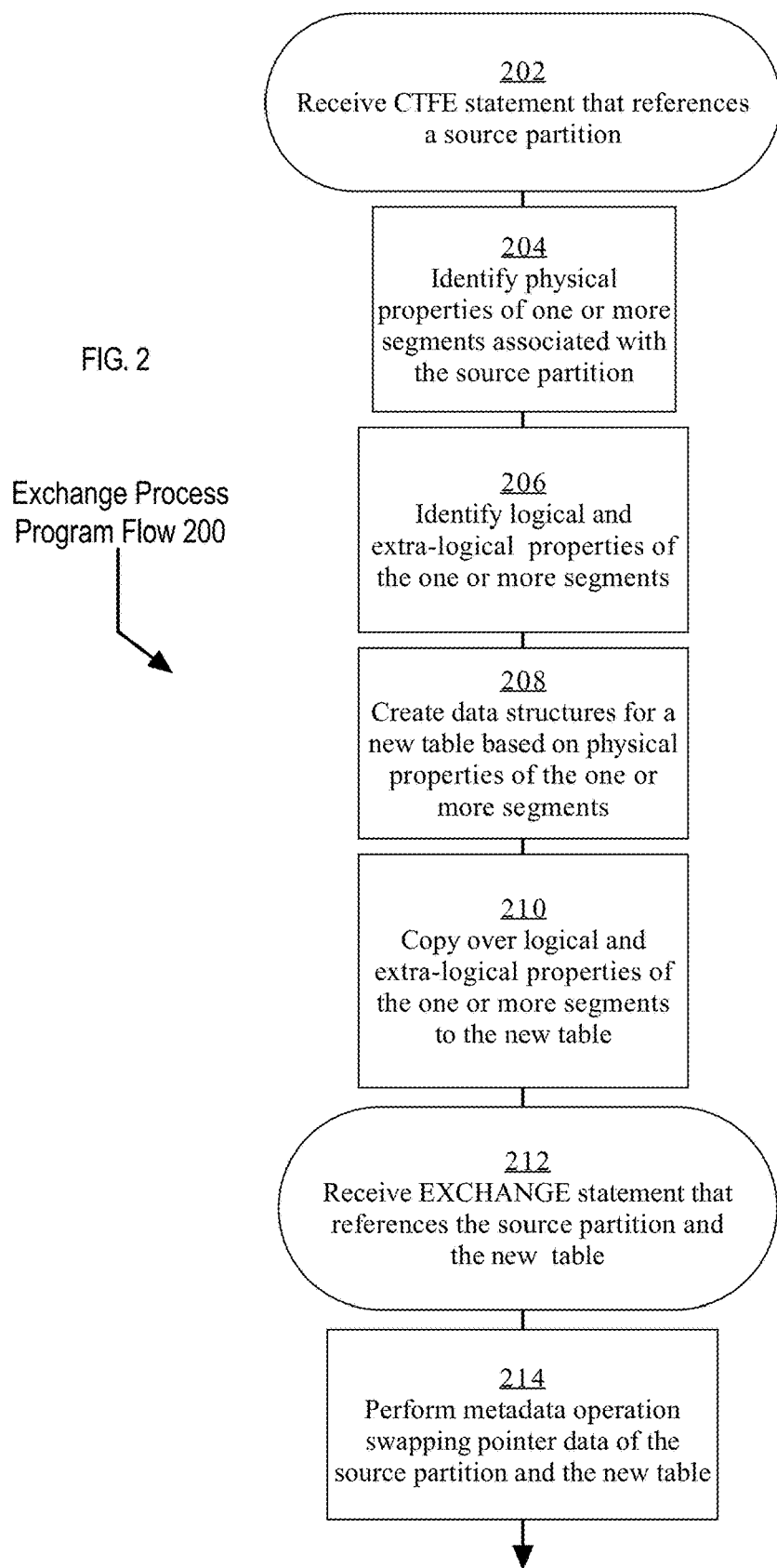

Logical Depiction of Table 300

|     | C1   | C2   | C3   |
|-----|------|------|------|
| R1  | R1C1 | R1C2 | R1C3 |
| R2  | R2C1 | R2C2 | R2C3 |
| R3  | R3C1 | R3C2 | R3C3 |
| R4  | R4C1 | R4C2 | R4C3 |
| R5  | R5C1 | R5C2 | R5C3 |
| R6  | R6C1 | R6C2 | R6C3 |
| R7  | R7C1 | R7C2 | R7C3 |
| R8  | R8C1 | R8C2 | R8C3 |

Logical Depiction of Table 350
(after exchange 370)

|    | C1   | C2   | C3   |
|----|------|------|------|
| R1 | C1R1 | C2R1 | C3R1 |
| R2 | C1R2 | C2R2 | C3R2 |
| R3 | C1R3 | C2R3 | C3R3 |
| R4 | C1R4 | C2R4 | C3R4 |
| R5 | C1R5 | C2R5 | C3R5 |
| R6 | C1R6 | C2R6 | C3R6 |

Logical Depiction of Table 300
(after exchange 370)

|    | C1   | C2   | C3   |
|----|------|------|------|
| R7 | C1R7 | C2R7 | C3R7 |
| R8 | C1R8 | C2R8 | C3R8 |

FIG. 3E

FIG. 4B
Physical Depiction of Table 400

DATA DICTIONARY 170

Table 400 Metadata

| Table Properties 402 | |
|---|---|
| C1 {int} | +40, +120 |
| C2 {tinyint(1)} | +52, +132 |
| C3 {varchar(60)} | +60, +140 |

| Partition Criteria 404 | |
|---|---|
| Q1 Criteria | Jan-01<C2<Mar-31 |
| Q2 Criteria | Apr-01<C2<Jun-30 |
| H1 Criteria | 0<1/C3<0.5 |
| H2 Criteria | 0.5<1/C3<1 |

| Partition Mappings 406 | |
|---|---|
| Sub-Partition Q1H1 | Segment 412 |
| Sub-Partition Q1H2 | Segment 422 |
| Sub-Partition Q2H1 | Segment 432 |
| Sub-Partition Q2H2 | Segment 442 |

| Segment Pointers 408 | |
|---|---|
| Segment 412 | x32432 |
| Segment 422 | x42345 |
| Segment 432 | x62345 |
| Segment 442 | x74345 |

TABLESPACE 180

TABLE 400

Segment 412

| x32432 | x41322 |
|---|---|
| x41322 | Ext. Length 1 |
| x41323 | Txn History |
| x41324 | R5C1, R5C2, R5C3, R6C1, R6C2, R6C3 |
| x41325 | |

Segment 422

| x42345 | x54634 |
|---|---|
| x54634 | Ext. Length 1 |
| x54635 | Txn History |
| x54636 | R7C1, R7C2, R7C3, R8C1, R8C2, R8C3 |
| x54637 | |

Segment 432

| x62345 | x73345 |
|---|---|
| x73345 | Ext. Length 1 |
| x73346 | Txn History |
| x73347 | R7C1, R7C2, R7C3, R8C1, R8C2, R8C3 |
| x73348 | |

Segment 442

| x74345 | x74634 |
|---|---|
| x74634 | Ext. Length 1 |
| x74635 | Txn History |
| x74636 | R7C1, R7C2, R7C3, R8C1, R8C2, R8C3 |
| x74637 | |

Physical Depiction of Table 450

| DATA DICTIONARY 170 | |
|---|---|
| Table 450 Metadata | |
| Table Properties 452 | |
| C1' {int} | +40, + 120 |
| C2' {tinyint(1)} | +52, + 132 |
| C3' {varchar(60)} | +60, + 140 |
| Partition Criteria 454 | |
| H1' Criteria | 0<1/C3<0.5 |
| H2' Critieria | 0.5<1/C3<1 |
| Partition Mappings 456 | |
| Partition H1' | Segment 462 |
| Partition H2' | Segment 472 |
| Segment Pointers 458 | |
| Segment 462 | x84563 |
| Segment 472 | xA4563 |

TABLESPACE 180

TABLE 450

Segment 462

| x84563 | x93345 |
|---|---|
| x93345 | Ext. Length 1 |
| x93346 | Txn History |
| x93347 | |
| x93348 | |

Segment 472

| xA4563 | xA3345 |
|---|---|
| xA3345 | Ext. Length 1 |
| xA3346 | Txn History |
| xA3347 | |
| xA3348 | |

FIG. 4C

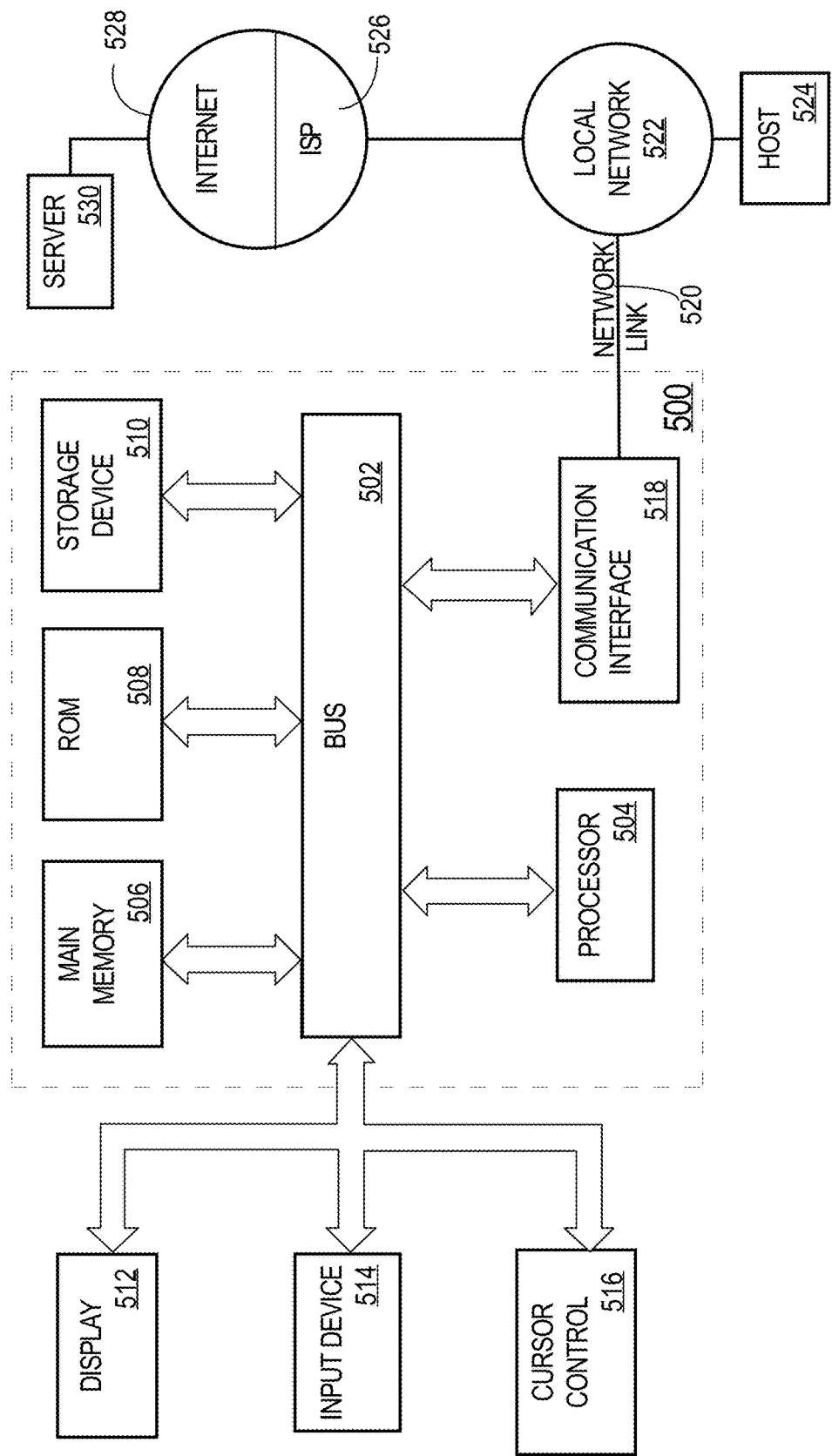

CREATE TABLE FOR EXCHANGE

CROSS-REFERENCE TO RELATED APPLICATIONS; BENEFIT CLAIM

This application claims the benefit of Provisional Appln. 62/243,346, filed Oct. 19, 2015, the entire contents of which is hereby incorporated by reference as if fully set forth herein, under 35 U.S.C. § 119(e).

FIELD OF THE INVENTION

The present invention relates to database definition language (DDL) operations, and more specifically to improved computer-implemented techniques for creating a new database table for an exchange with at least a portion of another database table.

BACKGROUND

Data is often stored in one format or location for short-term storage, and then stored in a different format or location for long-term storage. For example, in on-line transaction processing (OLTP), data may be stored for a short term in one or more regional databases, and then compressed and transferred to a centralized data warehouse for long term storage. To transfer data from an OLTP system to a data warehouse, data is organized as it is entered into the OLTP system and then discrete portions of the organized data are transferred to the data warehouse when resources permit.

A typical approach for organizing data is storing the data in tables that are organized into rows and columns. The tables are further divided into non-overlapping "sub-tables" called table partitions. Each table partition may be considered a bucket, and each given record is placed into a table partition based on the value of a data item in a particular column(s), the "partition key column(s)". For example, sales records may be stored in a table that is partitioned by "annual quarter". Sales records are entered into one of four different table partitions based on the value of the data item in the 'sales date' column. After a new quarter begins, the table partition corresponding to the previous quarter is scheduled for being compressed and transferred to a final destination in a data warehouse. Transferring in this case means to remove the data from the original sales table and only keep it in the final destination of the warehouse.

Compressing and transferring data from a source partition to a data warehouse may consume a large amount of time and computing resources depending on the number of records in the partition. Thus, rather than immediately transferring the data of a source partition, a metadata operation is used to separate ("remove") the records of the source partition from the rest of the table and to perform the actual transfer at a later point in time in a time window of lesser activity. To perform the metadata operation, a new table is created that has the same schema (column names and data types) as the table of the source partition. The metadata for the new table has pointer data that references an empty table in persistent storage. The metadata for the source partition has pointer data that references a set of records in persistent storage. When the records of the source partition need to be separated (removed from the original table), the pointer data of the source partition is swapped with the pointer data of the new table without physically moving the records of the source partition. Thus, the partition's records are effectively transferred into the new table by doing a pure metadata operation.

SQL statements exist to create a table from another table's schema. For example, a create table as select (CTAS) statement with a filter predicate that is "false", creates a new empty table based on the schema of a source partition:

CREATE TABLE new_table AS SELECT*FROM source_table WHERE 1=0;

Errors in the exchange process arise when the schema used to create the new table does not match how the source table stores and organizes the data in persistent storage. These errors occur when the properties of a table, such as column order, are exposed to users differently than how the data is organized in persistent storage. When the schema exposed by the CTAS statement is different than how the source table organizes data internally, the pointer data for the new table and the pointer data for the source partition end up referencing the wrong column positions after the exchange. When trying to access records in the new table or create records in the source table, the database management system accesses data items at locations and offsets that are incorrect, and the entire system breaks down.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a flow diagram illustrating an example program flow for the exchange process;

FIG. 3A is a block diagram illustrating a logical depiction of a table used for examples;

FIG. 3E is a block diagram illustrating a logical depiction of two tables after exchanging a partition between the tables;

FIG. 4B is a block diagram illustrating a physical depiction of the composite partitioned table used for examples;

FIG. 4C is a block diagram illustrating a physical depiction of a new table created based on physical properties of a partition of the composite partitioned table;

FIG. 5 is a block diagram illustrating a computer system that may be used to implement the techniques described herein.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein to create a new table for an exchange operation based on a source table's "physical" properties (in addition to the "logical" attributes). The process is initiated with a SQL statement such as "CREATE TABLE table_name FOR EXCHANGE WITH TABLE source table [PARTITION source_partition]". The initial DDL statement received by a relational database management system (rDBMS) to start the exchange process may be referred to herein as a create table for exchange (CTFE) statement.

Properties of a database object (e.g., a table) that to how data structures are organized in various storage units of database data. Examples of storage units include, but are not limited to, data blocks, extents, segments, and partitions. An example of a physical property is the order of columns in the rows stored in a data block.

Properties of a database object (e.g., a table) that relate to how the data is exposed to entities external to the rDBMS are described herein as "logical" or some conjugation thereof. All properties that are not logical may be referred to as extra-logical properties.

A data definition language (DDL) statement may cause a database server instance to change the properties of a table in different ways based on the composition of data in the table and even based on the operations that have been performed on the table prior to receiving the DDL statement. Technically two tables that look 100% logically identical can have substantially different physical properties, depending on how the tables were created and modified. Because re-creating the exact records and database operations that cause the properties of a partition to change is impractical, techniques are described herein to create a new table based on the properties of one or more source partitions. Identifying physical properties of a source table is particularly important because these properties must be the same for all partitions of a table after an exchange occurs in order for table-wide access mechanisms to work correctly. Additional properties, both extra-logical and logical, are copied from metadata of the source table to the new table to prevent additional errors from occurring after an exchange occurs. In particular extra-logical properties may be copied from metadata to create a table with partitions that have similar properties to a partition with sub-partitions.

System Overview

Figure 1:
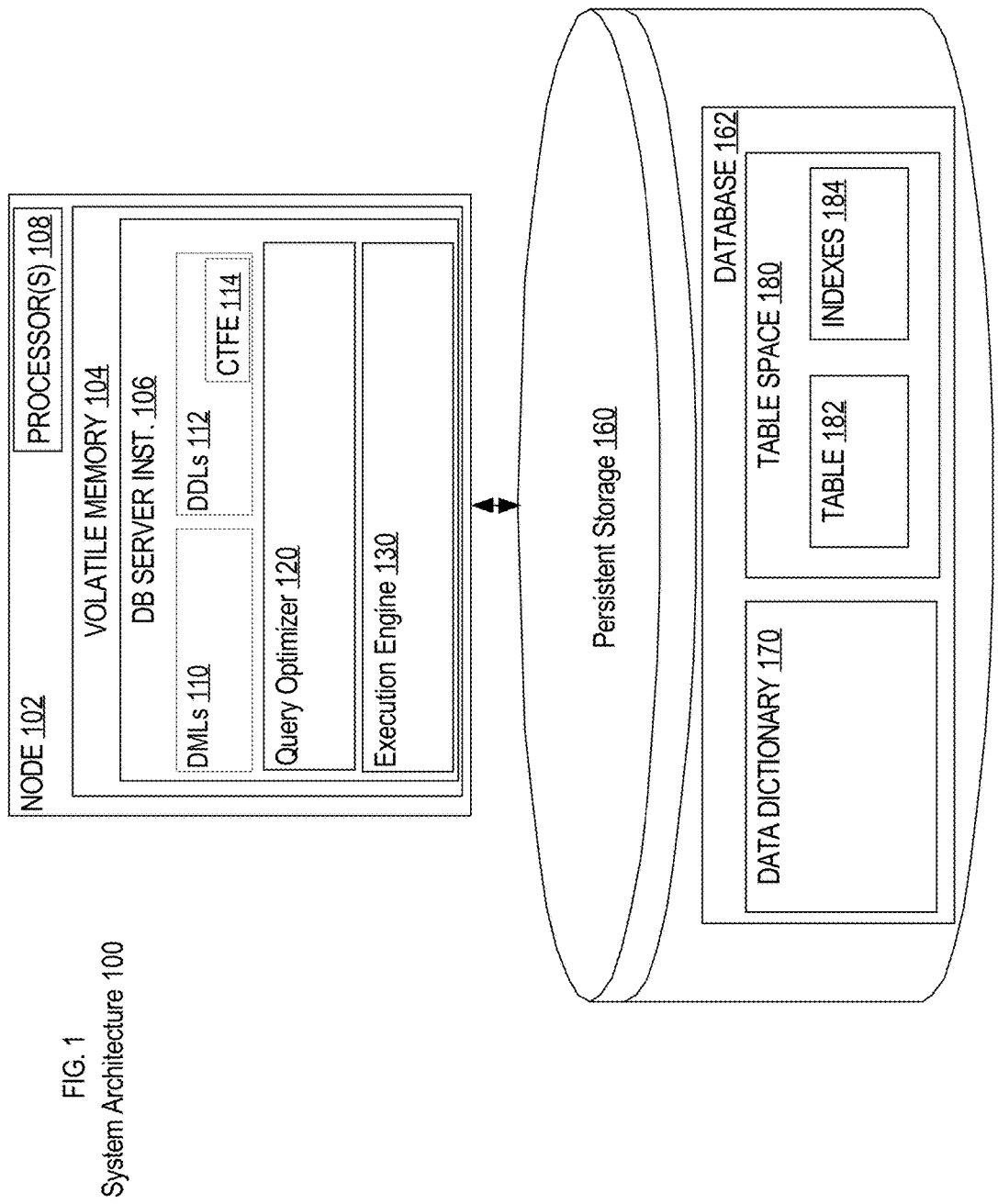
FIG. 1 is a block diagram illustrating an example system architecture of an rDBMS configured to execute a CTFE statement.

FIG. 1 is a block diagram illustrating an example system architecture of a relational database management system (rDBMS) 100 with a database instance configured to process a CREATE TABLE FOR EXCHANGE statement. For purpose of illustration, the rDBMS 100 is shown as one database server computer 102 executing one database server instance 106 coupled to a database 162 stored in persistent storage 160. In alternative embodiments, the rDBMS 100 may comprise one or more database server computers each executing one or more database server instances coupled to a database stored on one or more shared persistent storage devices (e.g., hard disks or flash memories). For example, while in the illustrated embodiment database server computer 102 is executing a single database server instance 106, in alternative embodiments three database server computers may execute three respective database server instances, wherein each database server computer is operatively coupled to the same shared disks.

Database server instance 106 executes database commands that are submitted to database server computer 102 by one or more users or database applications. These users and database applications may be referred to herein as external entities to signify that they are external to the internal programs and structures of the rDBMS 100. An external entity may be connected to the rDBMS 100 through a network in a client-server relationship.

Database server instance 106 further comprises a query optimizer 120 and an execution engine 130. The query optimizer 120 receives a database statement, parses the query, and determines an execution plan for executing the query. The query optimizer 120 determines an execution plan for both DML (data manipulation language) and DDL statements, such as a CTFE statement 114. In the case of DML statements, determining an execution plan may entail determining an optimal execution plan, based on for example, database statistics. The query execution engine 130 executes database operations of a database statement execution plan.

Database 162 comprises tablespaces, including tablespace 180, which store data for database objects (e.g., tables, indexes, logs, and control files). Metadata regarding these database objects is stored in data dictionary 170.

Data Dictionary

The data dictionary 170 is a set of tables that provide metadata about the database 162.

A data dictionary may include information about database objects in database 162 such as the following:

The table properties of every schema object in the database 162, including, but not limited to logical column order, column names, column data types, column offset positions, whether a column has a special property such as hidden or virtual, default values for columns, and integrity constraint information The partition criteria for tables that are partitioned including the partitioning type (e.g., range partitioned, hash partitioned, list partitioned) and the partition key (e.g., column name).

The mappings of each table, its partitions, or its sub-partitions to tablespace structures such as segments and extents.

The pointer data for table data structures (e.g., segments).

The data dictionary is a central part of data management. For example, in order for a database server instance to access the database, the instance performs the following actions:

The query execution engine 130 accesses the data dictionary 170 to find information about users, schema objects, and storage structures before providing access to a particular table to execute operations caused by a DML statement.

Before providing access to a particular table, the query execution engine 130 modifies the data dictionary 170 to execute operations caused by a DDL statement.

Table Data Structures

Table data is stored in one or more ranges of physical addresses on persistent storage or volatile memory in various physical data structures, which comprise:

a. data blocks
b. extents
c. segments
d. partitions

A table is composed of a single segment in the case of a non-partitioned table and multiple segments in the case of partitioned tables; segments are composed of extents, and extents are composed of data blocks. A partitioned table is composed of partitions. For single-level partitioning, each partition is composed of a single segment. In the case of composite partitions, the partitions may be composed of one or more segments.

The smallest table data structure is referred to as a data block. A data block is an atomic unit of data that a database server may request to read from and write to a storage device that stores table data in, for example, a block-mode storage device. In order to retrieve a row from a storage device, a data block containing the row is read into memory, and the data block is further examined to determine the row's location within the data block.

A data block may be constrained to a discrete number of physical addresses (i.e., a discrete size) for paging purposes. A data block may comprise data items and header metadata for data block specific information such as transaction history of data items within the data block. In a preferred embodiment, the data items correspond to a set of logically contiguous rows organized into physical columns in row-major format. For example, a data block may contain two rows of data items, R1C1, R1C2, R1C3, R2C1, R2C2, R2C3, and metadata regarding said data items in a discrete number of contiguous memory addresses.

The next largest data structure of a table is referred to as an extent. An extent comprises a set of contiguous data blocks (i.e., contiguous within an address space). An extent may also comprise metadata describing the length of the extent, the number of data blocks in the extent, the end address of the extent, or any combination thereof. For example, an extent may comprise two data blocks B1 and B2 and head metadata describing the length of the extent as 2.

The next largest data structure of a table may be referred to as a segment. The "data" of a segment comprises a set of extents. The "header metadata" of a segment may comprise pointer data to the locations of each extent of the segment.

A table partition, or simply "partition", refers to a particular type of segment that only contains records with values in a particular column that meet certain partition criteria. The partition criteria may be defined by a database administrator using various partitioning methods. For example, in list partitioning, an administrator defines the partition criteria as records that have one of a list of enumerated values in a particular column for each partition. In range partitioning, the administrator defines the partition criteria as records that have values in a particular column that fall within a particular range for each partition. In hash partitioning, the administrator defines the partition criteria as a hash function and the database server instance 106 further defines the partition as only having records that have values in a particular column that fall within a particular range calculated by the hash function.

When a table has multiple levels of partitions, the table is referred to as composite partitioned. In a composite partitioned table, each partition has one or more sub-partitions, and the sub-partitions each correspond to a segment.

Proccessing DDL Statements

DDL statements 112 are processed by a database server instance 106 determining the best query execution plan for a set of one or more database server instances to execute the query against one or more database objects. Then, the set of database server instances create, alter or remove metadata that defines the one or more database objects according to the plan. The DDL operation may require that a database server instance alter data dictionary 170 and/or database objects in tablespace 180.

For example, assume node 102 receives the following DDL statement.

CREATE TABLE Table_182 (C1 int, C2 tinyint(1), C3 varchar(255));

The database server instance 106 determines the field names: C1, C2, C3 and their respective data types: int, tinyint(1), and varchar(60). Then the database server instance 106 creates a segment, an extent, and an empty data block in tablespace 180 to host the data of the newly created table. The database server instance 106 also creates metadata in dictionary 170 describing how to access particular columns in the newly created table 182.

Processing DML Statements

DML statements 110 are processed based on the physical layout of the data as it resides in the database. For example, assume node 102 receives the following DML statement.

SELECT COUNT(*) FROM table_182 WHERE c3=2;

The database server instance 106 determines that records from table 182 need to be read based on the filter predicate c3=2. Then the database server instance 106 creates a query execution plan using a query optimizer 120. The query optimizer 120 estimates the cost of filtering the data in table 182 in various ways (e.g., partition pruning, parallelization, etc.) based on statistics collected on table_182 regarding the data in column c3.

For purposes of explanation, assume the query optimizer 120 selects a query execution plan where the query execution engine 130 simply reads every record in table_182 and only returns the records with the value 2 in column c3. To perform the read, the query execution engine first reads the metadata of table 182 to determine the offset locations of data items in column C3 with respect to the beginning of each data block. Then the query execution engine 130 proceeds to scan all the data blocks of table 182 by first reading the offset locations of column c3 at the word length of data items in column c3. As column c3 is truncated from the table 182, the records with value 2 in column c3 are identified, then those records are scanned and returned to the external entity that sent the query by the database server instance 106.

For example, the third column of table 182 is located at offsets 60, 140, and 220 bytes of each data block and contains 8 bytes of information as the word length. A database server instance 106 traverses the table 182 as it is stored, by scanning 8 byte word lengths after jumping 60 bytes, 140 bytes, and 220 bytes from the start address of each data block.

Exchange Process Overview

FIG. 2 is a flow diagram illustrating an example program flow for the exchange process. In step 202, a database server instance receives a CTFE statement that references a source partition. In step 204, the database server instance identifies physical properties of one or more segments associated with the source table and the source partition. At step 206, the database server instance identifies the specific logical and extra-logical properties of the source partition. Using the metadata identified in step 204, the database server instance allocates memory for a new table at step 208, and creates data structures for a new table based on the physical properties of the one or more segments associated with the source partition. Then, at step 210, the database server instance copies over the logical and extra-logical properties of the one or more segments associated with the source partition using the metadata identified at step 206. Once steps 202 through 210 are complete, a new table is created in persistent storage and referenced in the data dictionary based on the physical, logical, and extra-logical properties identified from the one or more segments associated with the source partition.

In some embodiments, the rDMBS then performs no actions until receiving an exchange statement or similar swap command. In these embodiments, the rDBMS receives an exchange statement referencing the source partition and the new table at step 212.

Depending on the rDBMS being used, the metadata of the source partition that is the basis for creating the new table may be stored in different locations (e.g., in data dictionary 170 or in a specific table such as table 182). Additionally, the location of pointer data that is swapped in the exchange step 214 may be in different locations. FIGS. 3A-3E depict an example of the states of an rDBMS and an associated database while exchanging a single segment corresponding to a partition of a table. FIGS. 4A-4E depict an example of the states of an rDBMS and an associated database while exchanging multiple sub-partitions corresponding to a partition of a table.

Processing a CTFE DDL Statement

In a preferred embodiment, database server instance 106 is configured to receive a create table for exchange (CTFE) statement that references a single partition or table. Assume node 102 receives a query statement CREATE TABLE table_350 FOR EXCHANGE WITH TABLE table_300;

Database server instance 106 is configured to identify logical, physical, and extra-logical properties of the single-level partitioned table 300 based on this query statement. FIG. 3A is a block diagram illustrating a logical depiction of a table that is divided into two partitions p1 and p2. Partition p1 includes records/rows R1-R6, and partition p2 comprises records R7-R8. A logical property of table 300 is the logical column order of C1, C2, C3.

Figure 3B:
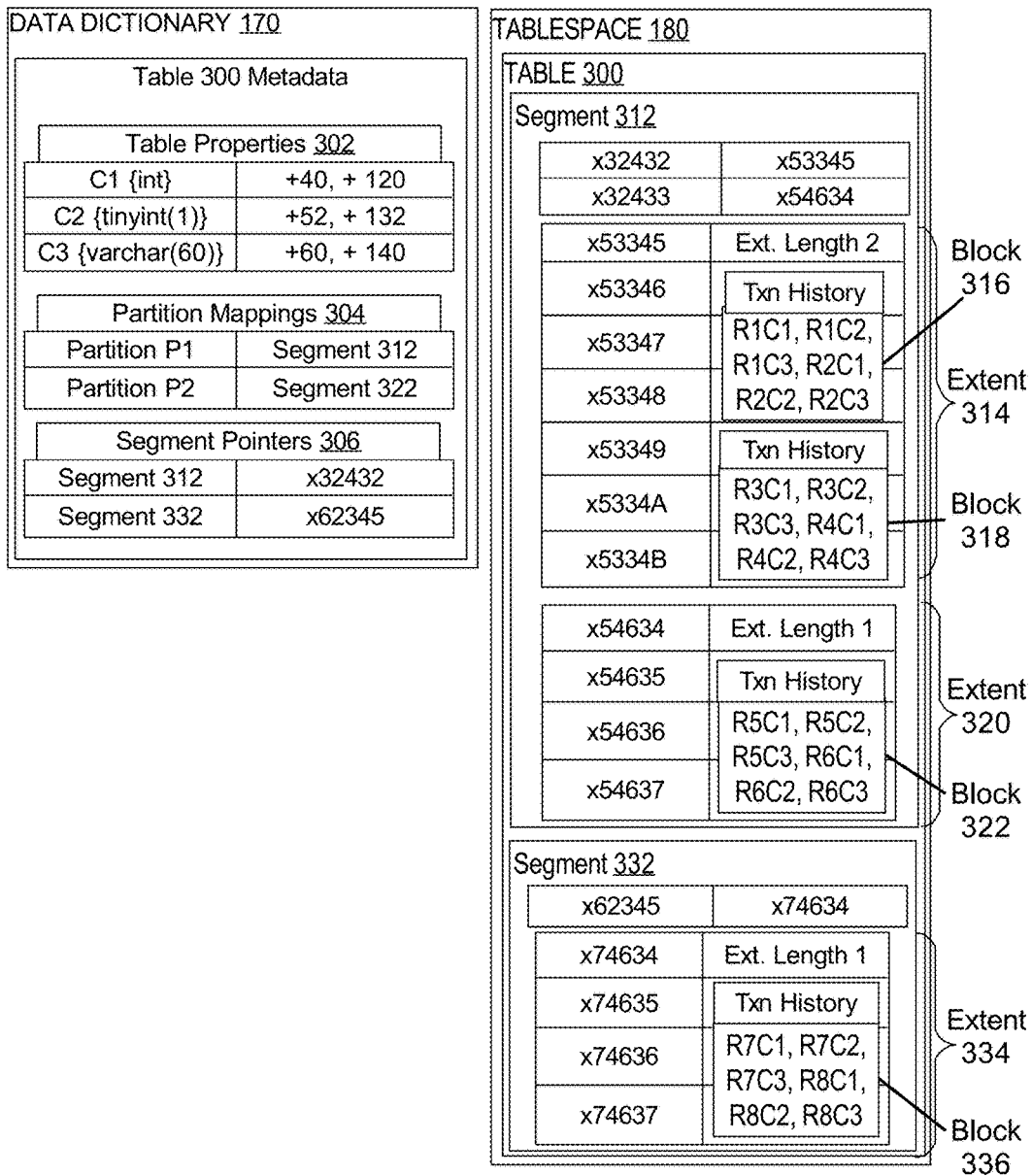
FIG. 3B is a block diagram illustrating a physical depiction of the table used for examples.

FIG. 3B is a block diagram illustrating a physical depiction of a table used for examples. The physical depiction of table 300 comprises both the metadata regarding table 300 in data dictionary 170 and table 300 including its various data structures: segments 312, 332; extents 314, 320, 334; and data blocks 316, 318, 322, and 336. A physical property of table 300 is the physical column order C1, C2, C3. Another physical property of table 300 is the column offset positions.

To identify the properties of table 300, both the logical properties and the physical properties of table 300 are described in table properties 302. The logical column order is determined by the position of each column within the schema, and the physical column order is determined by the offset locations in relation to each other (i.e., column C2 at +52 is after column C1 at +40, but before column C3 at +60).

The database server instance 106 may scan the data dictionary 170 to determine properties of table 300 such as the name of each column and the data type/word length of each column. The database server instance 106 may also scan table 300 for metadata to determine properties of table 300.

Using the data dictionary and/or data structure metadata, database server instance 106 determines properties such as column names, data types, encryption, physical column number, and logical column number, or any sub-combination thereof. As illustrated in Table 1, the physical column properties identified for partition p1 line up with the logical column properties.

TABLE 1

Column properties for table 300

| Internal Column Number | Name | Physical Column Number | Logical Column Number |
|---|---|---|---|
| 1 | C1 | 1 | 1 |
| 2 | C2 | 2 | 2 |
| 3 | C3 | 3 | 3 |

Once the physical column properties of a source table are determined, these physical properties are used as creation parameters to create data structures of a new table 350. Once the new data structures are created in persistent storage, logical column properties of a source partition (e.g., p1) may be copied into the metadata of the newly created table.

Figure 3C:
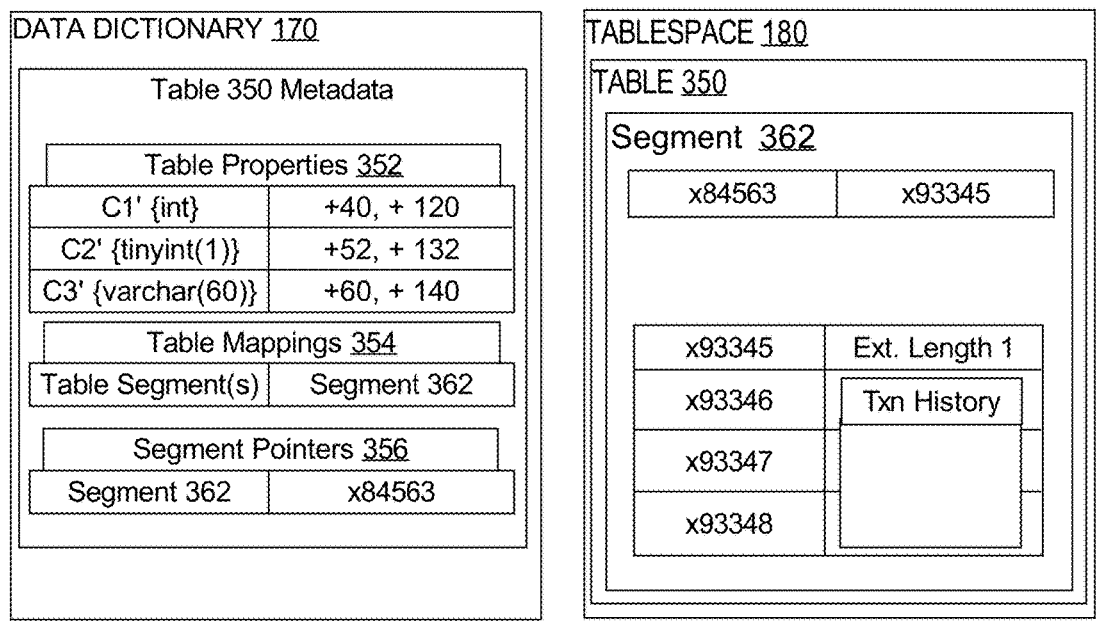
FIG. 3C is a block diagram illustrating a physical depiction of a new table created based on physical properties of a partition.

FIG. 3C is a block diagram illustrating a physical depiction of a new table created based on physical properties of a source partition. For example, the new table 350 is created in persistent storage 160, using the properties as illustrated in table 1. As illustrated in FIG. 3C, the physical properties of table 350 match those of table 300. The columns C1', C2', and C3' of table 300 are located at the same offsets as their respective source columns C1, C2, C3. It follows that the columns C1', C2', and C3' are also stored in the same physical order in row-major format as C1, C2, and C3. The logical column properties of table 350 also match those of table 300. Table 350 has three columns C1', C2', C3' visible to any user that requests a description of the table schema, and these columns that have the same field names, order, and data types as C1, C2, C3 of table 300.

Exchanging the Tables

In some embodiments, the rDMBS then performs no actions until receiving an exchange statement or similar swap command. In other embodiments, the exchange statement and the CTFE statement may be integrated in a single query statement. In a preferred embodiment, database server instance 106 is configured to receive an exchange statement. Assume node 102 receives a query statement.

ALTER TABLE table_300
EXCHANGE PARTITION p1 WITH TABLE table_350;

Database server instance 106 first identifies from partition mappings 304 that segment 312 is associated with partition p1. Then from table mappings 354, database server instance 106 identifies that segment 362 is associated with table 350. In a metadata operation, database server instance 106 swaps the pointer data of segment 312 with the pointer data of segment 362. The pointer data may be located exclusively in data dictionary 170 or in metadata of tables 300 and 350 in tablespace 180, or in both the data dictionary 170 and the metadata of tables 300, 350 in tablespace 180.

Figure 3D:
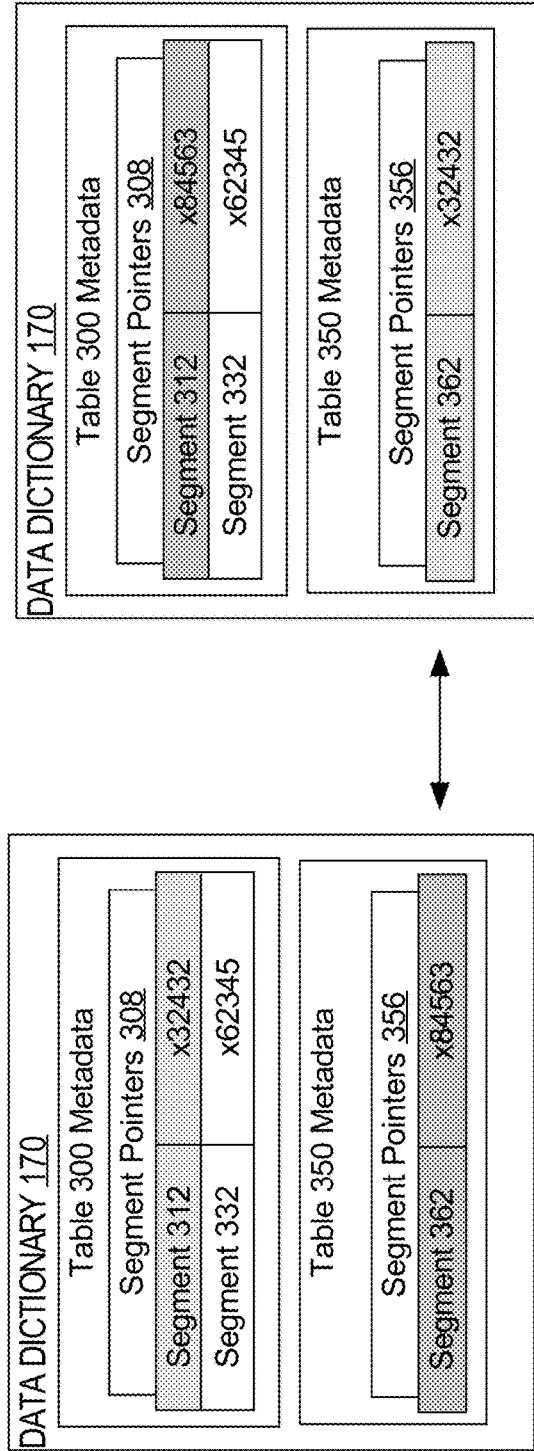
FIG. 3D is a block diagram illustrating a physical depiction of the data dictionary for two tables before and after exchanging a partition between the tables.

FIG. 3D is a block diagram illustrating a physical depiction of the data dictionary for two tables after exchanging segments between the tables. Prior to the exchange, the pointer data 306 of segment 312 referenced address 'x32432' and the pointer data 356 of segment 362 referenced address 'x84563'. After the exchange, the segment pointer data 306 of segment 312 and the segment pointer data 356 of segment 362 are swapped. The pointer data 306 of segment 312 references address 'x84563' and the pointer data 356 of segment 362 references address 'x32432'.

The effect of the exchange process is that the records that were in segment 312 are no longer located in table 300. FIG. 3E is a block diagram illustrating a logical depiction of two tables after exchanging segments between the tables. Table 350 now contains data records that were previously housed in table 300.

Composite Partitions

A technique, referred to herein as composite partitioning, involves creating partitions of partitions, also called sub-partitions. For example, a table may be partitioned using a range based partitioning scheme to create a set of first-level partitions. A hash function may then be applied to each of the first-level partitions to create, for each first level partition, set of second level partitions. Further, the partitioning key used to create the partitions at one level may be different than the partitioning key used to create the partitions at other levels. Examples of composite partitioned tables include, but are not limited to, range-hash, range-range, and hash-hash. Other examples include three or more levels of partitioning such as range-range-hash. In the case of a composite partitioned table, a sub-partition may refer to a partition of a partition.

Figure 4A:
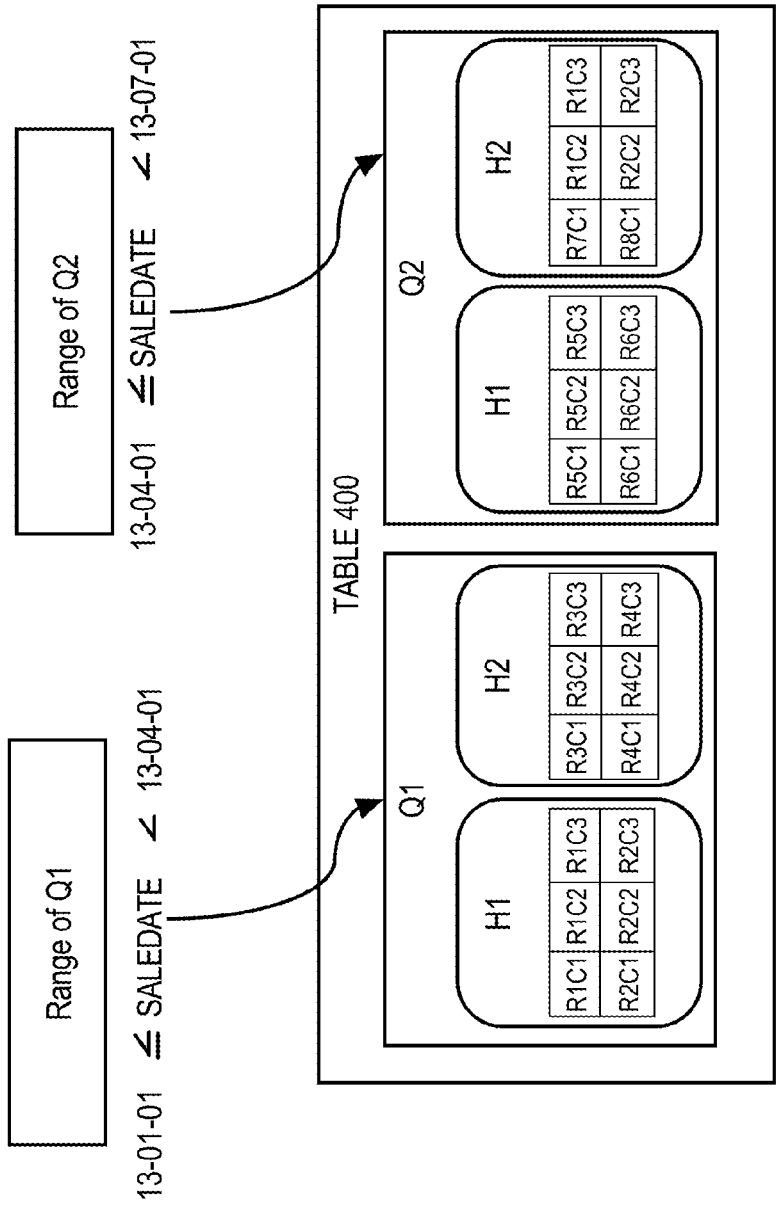
FIG. 4A is a block diagram illustrating a logical depiction of a composite partitioned table used for examples.

In tables with composite partitions, records are stored in segments based on how they meet each of the partition criteria. For example, if a sales table is range partitioned to organize the records into two partitions that represent the first two quarters of the year and hash partitioned to divide the records into two hash buckets, then the table is subdivided into four sub-partitions. FIG. 4A is a block diagram illustrating a composite partitioned table. Table 400 is ranged partitioned at a first level by annual quarter (e.g., Q1, Q2). Table 400 is hash partitioned at a second level (e.g., H1, H2). Table 400 thus has four sub-partitions corresponding to Q1H1, Q1H2, Q2H1, and Q2H2.

Exchanging a Partition with Sub-Partitions

In an embodiment, database server instance 106 is configured to receive a create table for exchange (CTFE) statement that references a partition of a composite partitioned table. Note that identifying properties of a partition as described herein based on a CTFE statement is not possible with a CTAS statement. Executing a CTAS statement involves creating the physical table structures from scratch based on the columns selected from one or more source tables. In a CTFE statement, the physical table structures are created based on the source partitions physical table structures. For example, assume node 102 receives a query statement.

CREATE TABLE table_450 FOR EXCHANGE WITH TABLE table_400 PARTITION Q1;

Database server instance 106 is configured to identify columns and column properties of the source partition Q1 based on this query statement. Physical properties may be determined from the data dictionary 170 or metadata of data structures in table 400. FIG. 4B is a block diagram illustrating a physical depiction of a table used for examples. The physical depiction of table 400 comprises both the metadata regarding table 400 in data dictionary 170 and table 400 in tablespace 180. In FIG. 4B, table 400 is comprised of four segments 412, 422, 432, 442 that correspond to their respective sub-partitions Q1H1, Q1H2, Q2H1, Q2H2.

To identify the properties of partition Q1, both the logical properties and the physical properties of table 400 are described in table properties 402. The logical column order is determined by the position of each column within the schema, and the physical column order is determined by the offset locations in relation to each other. Because Q1 has sub-partitions Q1H1 and Q1H2, the database server instance 106 may also need to determine extra-logical properties of the partition criteria of the sub-partitions from partition criteria 404 (i.e., H1 criteria, H2 criteria). In the embodiment described in FIG. 4B, the partition criterion of the hash partitions (H1, H2) is independent of the partition criterion of the range partitions (Q1, Q2). However, in another embodiment, sub-partitioning information may be different for individual partitions. In this other embodiment, the partition criteria 404 is described for each sub-partition Q1H1, Q1H2, Q2H1, Q2H2.

Once the properties of a source partition Q1 are determined, the physical properties are used as creation parameters to create data structures of a new table 450. Once the new data structures are created in persistent storage, logical properties and extra-logical properties of the source partition may be copied into the metadata of the newly created table.

FIG. 4C is a block diagram illustrating a physical depiction of a new table created based on properties of a source partition. As illustrated in FIG. 4C, the table properties 452 of table 450 match the table properties 402 of table 400. Furthermore, the partition criteria 454 of table 450 has first level partition H1' criteria and H2' partition criteria that matches the second level partition criteria 404 of the Q1 partition in table 400.

In a preferred embodiment, database server instance 106 is configured to receive an exchange statement. Assume node 102 receives a query statement.

ALTER TABLE table_400

EXCHANGE PARTITION q1 WITH TABLE table_450;

Database server instance 106 first identifies from partition mappings 406 that segments 412, 422 are associated with partition Q1. Secondly, database server instance 106 identifies from partition mappings 456 that segments 462, 472 are associated with table 450. In a metadata operation, database server instance 106 swaps the pointer data 408 of segments 412, 422 with the pointer data 458 of segments 462, 472 respectively. The pointer data may be located exclusively in data dictionary 170 or in metadata of tables 400 and 450 in tablespace 180, or in both the data dictionary 170 and the metadata of tables 400, 450 in tablespace 180.

Figure 4D:
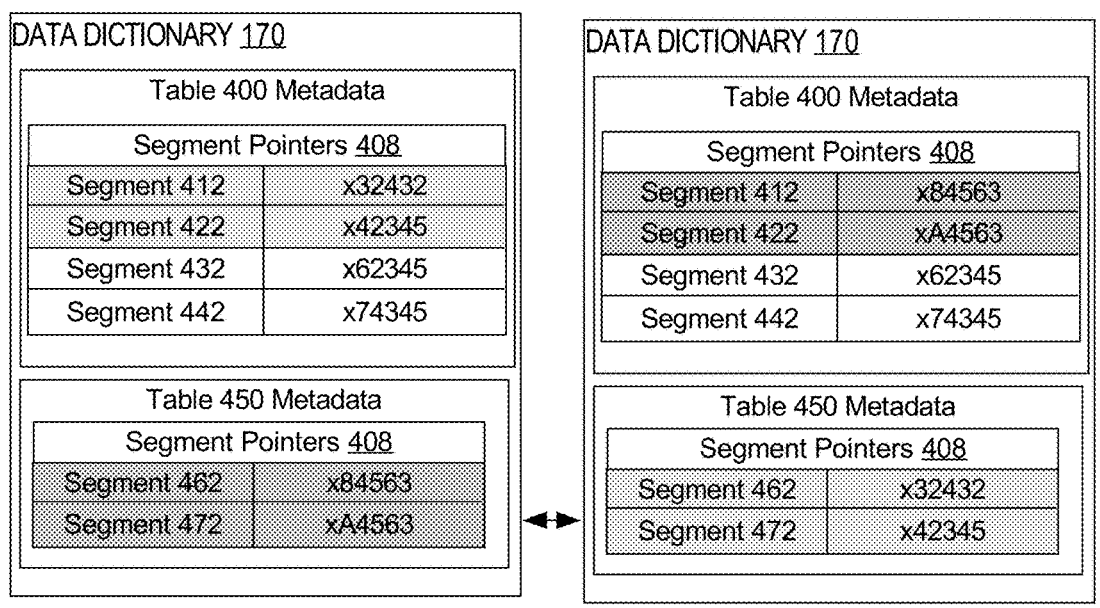
FIG. 4D is a block diagram illustrating a physical depiction of the data dictionary for two tables before and after exchanging two sub-partitions between the tables.

FIG. 4D is a block diagram illustrating a physical depiction of the data dictionary for two tables after exchanging segments between the tables. Prior to the exchange, the pointer data 408 of segments 412, 422 referenced addresses 'x32432', 'x42345' respectively, and the pointer data 458 of segments 462, 472 referenced addresses 'x84563', 'xA4563' respectively. After the exchange, the segment pointer data 408 of segments 412, 422 and the segment pointer data 458 of segments 462, 472 are swapped. The pointer data 408 of segments 412, 422 reference addresses 'x84563', 'xA4563' respectively, and the pointer data 458 of segments 462, 472 reference address 'x32432', 'x42345' respectively. Table 400 is still a composite partitioned table with four sub-partitions, and the new table 450 is still only a partitioned table with two partitions.

Figure 4E:
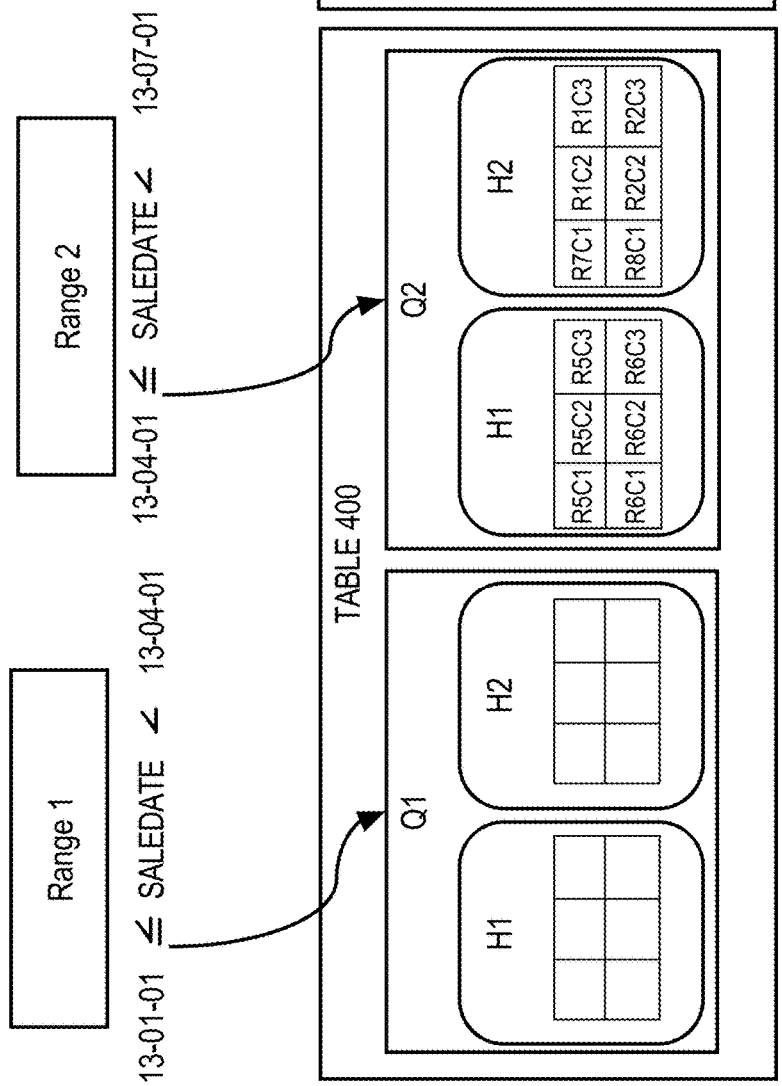
FIG. 4E is a block diagram illustrating a logical depiction of two tables after exchanging two sub-partition between the tables.

The effect of the exchange process is that the records in segments 412, 422 are no longer located in table 400. FIG. 4E is a block diagram illustrating a logical depiction of two tables after exchanging segments between the tables. Table 450 now contains records that were previously housed in table 400.

Identifying Properties That Effect How Data is Accessed

DDLs often create or change the physical and extra-logical properties of a table in ways that don't correspond to the logical properties of a table. Performing a CTFE operation involves identifying these changes from the source segments and creating a new table that includes these changes. Examples of extra-logical properties include, but are not limited to:

Properties that effect how data is accessed
   a. Hidden Columns, Unused Columns, Invisible Columns
   b. Virtual Columns, Hybrid Columns
Properties that affect how data is interpreted
   a. Encryption
   b. Compression
Properties that effect how other systems access the table
   a. Statistics collection properties for the query optimizer
   b. Hakan Factor for a Bitmap Index Techniques, described herein, are particularly useful for creating a table for exchange based on one or more source partitions that have physical properties or extra-logical properties that are different than what the corresponding logical properties would indicate. In the previous examples, the physical column numbers and logical column numbers of the segments were the same. However, there is no requirement that a physical column number correspond to a logical column number. For example, a column named "Date" may be exposed to external entities as the first column in a source table, but actually the column named "Date" is stored in the second column position of a block after an internally used "ID column" that is stored in the first position. If the ID column is hidden, an external entity does not have direct access to the "ID column" stored in the first position of each data block. The implementation of the CTFE operation provides for creating a new table with a hidden "ID column" and "Date" column logically in the first position of the new table based on the properties of the source table.

Properties That Effect How Columns are Accessed

When processing a CTFE statement, database server instance 106 identifies extra-logical properties that cause a physical column to not have a directly correlated logical column such as hidden, unused, or invisible columns. Additionally, when processing a CTFE statement, database server instance 106 identifies extra-logical properties that cause the existence of a logical column that does not have a directly correlated physical column such as hybrid columns and virtual columns.

A. CTFE With Hidden, Unused, or Invisible Columns

Hidden, unused, and invisible columns are not exposed to external entities through a CTAS statement. A hidden column is only accessible at the system level. An example of a hidden column is a physical column made by a database server instance 106 in table 184 to store an ID number for each row returned in a materialized view of the results of a SELECT statement. An external entity may never access the hidden column directly, but the database server instance 106 uses the hidden column to return the same rows in the same order when the materialized view is requested by an external entity multiple times. An unused column is not used at the system level or by external entities. An example of an unused column is a column that has been dropped from a table, but not physically deleted from persistent storage. An invisible column is a user specified property that is similar to a hidden column, but the user may still choose to access the column if the column is explicitly stated in a SELECT statement. An invisible column may be made revisable, which will logically add it as an additional column to the end of a table, but physically keeps the column in the same offset position within a data block. Hidden columns, unused column, and invisible columns all physically exist in persistent storage, but are not exposed to an external entity through a SELECT* statement.

Columns with these extra-logical properties provide a particularly useful use case for the CTFE operation. For example, node 102 receives a query that causes a database server instance to drop column C2 of table 182,
   "ALTER TABLE table_182 DROP_'C2';"

The database server instance 106 determines the cost of dropping column C2 from each segment of table 182 according to various plans, and then drops the column of each particular segment based on the most cost effective plan. For example, if a table is compressed using advanced compression, the ALTER TABLE DROP column statement may be converted to a SET UNUSED column operation.

Assume table 182 has advanced compression, making altering the metadata of table 182 to no longer reference column "C2" more cost effective than physically deleting the column C2 from each and every data block. Database server instance 106 makes column C2 unused.

When processing a CTFE statement for a partition of table 182, the physical and logical column properties are determined. As illustrated in Table 2, the physical column properties identified for table 182 are different than the logical column properties after column C2 is made unused.

TABLE 2

Column properties for table 182 after column C2 is made unused.

| Internal Column Number | Name | Physical Column Number | Logical Column Number |
|---|---|---|---|
| 1 | C1 | 1 | 1 |
| 2 | C2 | 2 | 0 |
| 3 | C3 | 3 | 2 |

Once the properties are identified, a new table is created in persistent storage. Using the identified properties, the database server instance creates table data structures that have space for three columns, and an extra-logical property describing physical column C2 as unused is copied over to the new table. When the pointer data for the segments of table 182 and the new table are swapped in the exchange operation, no errors will occur due to incorrect offset data for the locations of each column.

Note that simply creating a new table from scratch (e.g., CTAS) with column names C1, C3 would not create a table with the correct physical properties for an exchange with a segment of table 182. Even creating a new table (e.g., CREATE TABLE) with column names C1, C2, C3, and then dropping column C2 may not create a table with the correct physical properties for an exchange, particularly, because the new table would not have any data to cause database server instance 106 to make an unused column in response to the DROP column C2 statement instead of physically deleting the column. The new table would likely have properties similar to Table 3, and errors would occur when the exchange operation is executed because the database server instance would be given instructions to read columns at incorrect offsets.

TABLE 3

Column properties for table 182 based on a CTAS statement.

| Internal Column Number | Name | Physical Column Number | Logical Column Number |
|---|---|---|---|
| 1 | C1 | 1 | 1 |
| 2 | C3 | 2 | 2 |

The example used to create Table 2 is specifically for an unused column, but the same table would derived when a query causes the database server instance to make a hidden column or invisible column. The difference would be in the extra-logical property that is copied over. For example, the following query would also cause database server instance 106 to create a new table with properties as described in Table 2.

ALTER TABLE table_300 MODIFY 'C2' INVISIBLE;

Unlike unused columns however, "invisible" columns can be made visible again. For example, the following query would cause database server instance 106 to make column C2 visible.

ALTER TABLE table_300 MODIFY 'C2' VISIBLE;

If a CTFE statement were received after column C2 were made visible again, the logical column order of table 300 would be different than the physical column order. Thus, in response to receiving the CTFE statement, the database server instance 106 would create a new table with physical and logical column properties as illustrated in Table 4.

TABLE 4

Column properties for table 182 after column C2 is made invisible and then visible.

| Internal Column Number | Name | Physical Column Number | Logical Column Number |
|---|---|---|---|
| 1 | C1 | 1 | 1 |
| 2 | C2 | 2 | 3 |
| 3 | C3 | 3 | 2 |

B. CTFE With Virtual and Hybrid Columns

Virtual columns and hybrid columns are exposed to external entities as logical columns that are part of a table, but the values used in the logical columns are not all stored as data items in persistent storage. A virtual column is a column that is derived or computed when it is needed, but is otherwise not stored in the data item portion of a data block in persistent storage. A virtual column may be stored for a short period of time in temporary storage in volatile memory or persistent storage (e.g., in a buffer cache), and may be discarded at the end of an operation. An example of a virtual column is a virtual expression column, where the values of the column are defined as an operation on values from at least one other column (e.g., C4=C1+C2).

A hybrid column is a column that has one or more hidden columns associated with it, but the value in the logical column is derived or computed from the one or more hidden columns. A hybrid column uses both metadata and data items in the associated one or more hidden columns to derive the values for the corresponding logical column.

Columns with these extra-logical properties provide a particularly useful use case for the CTFE operation. For example, node 102 receives a query that causes a database server instance to add column C4 to table_182, "ALTER TABLE table_182 ADD COLUMN 'C4' INT DEFAULT 5;"

The database server instance 106 determines the cost of adding column C4 using various plans, and then adds the column based on the most cost effective plan.

Assume there are a threshold number of records already in table 182, so adding a hidden column and altering the metadata of each segment in table 182 to reference a column "C4" with a default value of '5' by making it a "hybrid column" is more cost effective than physically adding the column C4 with the data item value '5' to each and every data block.

Rather than adding the column C4 to every data block, a hidden control column is added to every data block to represent the C4 data items. If the value of the control column is NULL, then the database server instance uses the value '5' instead of NULL when displaying the data item as a logical column.

If the value of the column is not the default value of '5' (e.g., 3), the database server instance 106 changes the value of the control column from NULL to an actual value in the hidden value column. Thus, the value in the hidden value column can be NULL or any other value.

When processing the CTFE statement for a segment of table 182, the physical and logical column properties are derived as illustrated in Table 5. The physical column properties identified for table 182 are different than the logical column properties after column C4 is added as a hybrid column.

TABLE 5

Column properties for table 182 after column C4 is added as hybrid column.

| Internal Column Number | Name | Physical Column Number | Logical Column Number |
|---|---|---|---|
| 1 | C1 | 1 | 1 |
| 2 | C2 | 2 | 2 |
| 3 | C3 | 3 | 3 |
| 4 | C4 | 0 | 4 |
| 5 | Hidden Control Column | 4' | 0 |

Once the properties are identified, a new table is created in persistent storage. Using the identified properties, the database server instance 106 creates new table data structures that create data blocks for three columns, and copies over an extra-logical property describing column C4 as a hybrid column that is added to each data block. When the pointer data for the segments are swapped in the exchange operation, no errors will occur due to incorrect offset information.

Note that simply creating a new table from scratch (e.g., CTAS) with column names C1, C2, C3, C4 would not create a table with the correct physical properties for an exchange with a segment of table 182. Even creating a new table (e.g., CREATE TABLE) with column names C1, C2, C3, and then adding a column C4 may not create a table with the correct physical properties for an exchange, particularly, because the new table would not have any data to cause database server instance 106 to make a hybrid column in response to the "ADD Column C4 with Default value '5'" statement instead of physically adding the column to each data block. Instead, the new table would likely have properties as described in Table 6, and errors would occur when the exchange operation is executed because the database server instance 106 would be given instructions to read columns at incorrect offsets.

TABLE 6

Column properties for table 182 based on a CTAS statement.

| Internal Column Number | Name | Physical Column Number | Logical Column Number |
| --- | --- | --- | --- |
| 1 | C1 | 1 | 1 |
| 2 | C2 | 2 | 2 |
| 3 | C3 | 3 | 3 |
| 4 | C4 | 4 | 4 |

As one last aside, the example used to create Table 5 is specifically for a hybrid column, but a similar table would be derived when a query causes the database server instance 106 to make a virtual column. For example, the following query would cause database server instance 106 to create a similar table.

"ALTER TABLE table_300 ADD COLUMN 'C4' AS C1+C2;"

Unlike hybrid columns, virtual columns have no corresponding hidden column. If a CTFE statement were received after column C4 were added as a virtual, the logical properties of table 300 would be different than the physical properties. Thus, in response to receiving the CTFE statement, the database server instance 106 would create a new table with physical and logical column properties as illustrated in Table 7.

TABLE 7

Column properties for segment 302 after virtual column C4 is added.

| Internal Column Number | Name | Physical Column Number | Logical Column Number |
| --- | --- | --- | --- |
| 1 | C1 | 1 | 1 |
| 2 | C2 | 2 | 2 |
| 3 | C3 | 3 | 3 |
| 4 | C4 | 0 | 4 |

Properties that Effect How Data is Stored

In some embodiments, an rDBMS may allow a column to be encrypted or compressed. In these embodiments, a DDL statement that causes a database server instance to compress or encrypt the column at the physical level will not change the properties of the column at the logical level. A DML statement received by the database instance is automatically processed with an additional compressing/encrypting step for adding data to the column or decompressing/decrypting step for reading data from the column.

When processing a CTFE statement, a database server instance may scan for these particular properties for each column of the table to which source partition belongs. In some embodiments, scanning for these properties also includes scanning for the encryption key and/or compression/decompression algorithm that corresponds to the particular column that has been compressed. Depending on the embodiment, these properties may be stored in either in the data dictionary 170 or in the table header metadata for each particular column. These properties are then added to the column properties of the new table created based off of the data structures of the source partition in the CTFE operation. Note that encryption and compression have an effect up on the physical properties of a table because the column width likely changes based on the encryption or compression used. Encryption and compression also have an effect on the extra-logical properties of a table because a database server accessing the table must also access metadata for encrypting/decrypting or compressing/decompressing.

Properties that Effect How Other Systems Access the Table

Today's database systems have many systems that work on top of the basic database structures for reading and writing records of a table. Some of these systems use models of a table based on one or more properties of the table. If a segment of a table is exchanged with the segment of another table in a metadata operation, the properties of the table must remain consistent for the systems that rely on these properties to function properly. Two examples of these properties include the cost statistics for the query optimizer, and the Hakan factor for a Bitmap Index.

A. Statistics Collection Properties for the Query Optimizer

At this point, we have briefly discussed the concept of computational cost, and how the query optimizer 120 estimates the costs of various plans to determine which plan to send to the query execution engine 130 (or engines in there multiple nodes). In order to estimate the cost, the database server instance maintains various statistics on each table in the database. These statistics may be maintained in the data dictionary 170 or in the metadata of the table to which they belong (e.g., metadata in tablespace 180).

The statistical framework used to model data of a particular column may evolve as records are added to a particular table and based on how records from the particular table are used in database operations. For example, at first, the framework used to capture statistics for a column may include only determining the number distinct values for that column. If the column is never used for a database operation (e.g., filter or join on the column), then no additional statistics are taken on the column. When a query first references a column for a particular database operation, the number of distinct values statistic may be used to make a rough estimate of the cost of applying the database operation to that column. However, the fact that one database operation was performed against this column indicates that a more advanced model of the column may be more valuable in future cost estimates. For example, if the column only contains three values, statistics are maintained for the number of records that have an occurrence of each value. The number of distinct occurrences of a value may provide a more accurate estimation for applying future filter predicates. As another example, a column may contain many distinct values and many repeat occurrences of some of those values, the query optimizer 120 may determine that statistics on the distribution of values may be useful if the table is joined with other tables often. The 'distribution of values' statistic may help with cost estimation of using a bloom filter when creating a build table for a hash join rather than simply performing the hash join from scratch or even performing another type of join (e.g., nested loop, or a sort merge).

As part of the CTFE operation, properties are created for the new table of what column statistics to collect based on the column statistics collected for the columns of the source partition. Thus, when the new table is eventually exchanged with the source partition, the actual column statistic names already in place for the query optimizer 120 to request these same statistics from each segment of the parent table (e.g., the newly exchanged segment(s) have same statistics as the segments that were not exchanged).

Note the variance in scope of the properties that are copied over when creating a new table for exchange based on one or more source segments. The framework of which statistics to store is generated based on the entire parent table, but the statistics are maintained for each column at the segment level. Thus, in this embodiment, creating a table for exchange involves creating a new table based on table-level properties and segment-level properties.

B. Hakan Factor for a Bitmap Index

Some indexes rely on properties of a table that they index to function properly. A bitmap index has a bit vector for each discrete value of a column. When reading a data item from a bit vector, a database server instance relies on the number of rows in a data block (i.e., the Hakan Factor) to determine the data block that contains that row in the table that is indexed. For example, assume bitmap index 184 contains a different bit vector for each discrete value (e.g., red, blue, green) of a particular column (e.g., C1). When a query requests a particular value from that column (e.g., SELECT*FROM table_182 WHERE C1='RED';), rather than traversing each record in the entire table 182 for the particular value, the database server instance traverses the bit vector corresponding to that value in the bitmap index 184. Each consecutive row of the table corresponds to each consecutive bit of the bit vector. However, database server instance 106 can only search for rows by first searching for a particular data block. Thus, the number of rows in a data block is needed to estimate which data block hosts a particular row.

The Hakan factor estimates the number of rows in a data block. The Hakan factor may be calculated by the by summing the word length of each column in a row and subtracting a safety factor, and then dividing this number into the size of a data block. The safety factor is used to account for the possibility of adding a column to the table after the Hakan factor has been defined. Adding a column to the table reduces the number of rows that can be stored in a data block.

The Hakan factor is used for a variety of database processes, so it is not easy to change once it has been defined once. For example, although the number of columns in a data block of a table may change, the Hakan factor is a necessary property for database server instance 106 to access a particular row in table 182 based on the particular bit in a bit vector, so the Hakan factor of table is made immutable once bitmap index 184 is created.

Thus, as part of the CTFE operation, extra-logical properties (such as the Hakan Factor) that are relied upon by indexes of a source table are copied from the source table to the new table based on the corresponding properties of the source table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a DDL statement referring to a first database table and specifying to create a table for an exchange with at least a portion of the first database table;
   in response to receiving said DDL statement, creating a second database table having one or more physical properties of said first database table;
   wherein said one or more physical properties define data organization within data blocks storing said first database table on persistent storage;
   wherein said one or more physical properties include at least one of the following particular physical properties:
      a physical column order between columns of said first database table within said data blocks of said first database table, and
      a position within said data blocks for a column truncated from said first database table.

2. The method of claim 1, further comprising:
   prior to receiving the DDL statement, causing a first column in the first database table to be invisible; and
   in response to receiving said DDL statement, creating the second database table with a second column that is invisible based on the first column being invisible.

3. The method of claim 1, further comprising:
   prior to receiving the DDL statement, causing a first column in the first database table to be hidden; and
   creating the second database table with a second column that is hidden based on the first column being hidden.

4. The method of claim 1, further comprising:
   prior to receiving the DDL statement, causing a first column in the first database table to be virtual; and
   in response to receiving said DDL statement, creating the second database table with a second column that is virtual based on the first column being virtual.

5. The method of claim 1, further comprising:
   prior to receiving the DDL statement, causing a first column in the first database table to be encrypted; and
   in response to receiving said DDL statement, creating the second database table with a second column that is encrypted based on the first column being encrypted.

6. The method of claim 1, wherein at least one physical property of the first database table is different than a corresponding logical property of the first database table; wherein a logical property is a table property as exposed to an entity external to a relational database management system that accesses the first database table.

7. The method of claim 1, further comprising:
   prior to receiving the DDL statement, changing a logical column order in the first database table without changing the physical column order; and
   in response to receiving said DDL statement, creating the second database table with the same logical column order and physical column order as the first database table.

8. The method of claim 1, further comprising:
prior to receiving the DDL statement, changing how many rows are stored in a given data block without changing a particular extra-logical property indicating a number of rows in the given data block; and
in response to receiving said DDL statement, creating the second database table with one or more of the same extra-logical properties as the first database table including the particular extra-logical property indicating the number of rows in the given data block.

9. The method of claim 1, wherein the DDL statement refers to a partition with sub-partitions; and wherein the method further comprises: creating the second database table with one or more of the same extra-logical properties as the first database table including a partition criterion of the sub-partitions.

10. The method of claim 1, further comprising:
determining physical column properties of the one or more physical properties of said first database table.

11. One or more non-transitory computer-readable media storing a set of instructions, wherein the set of instructions include instructions which, when executed by one or more hardware processors, cause:
receiving a DDL statement referring to a first database table and specifying to create a table for an exchange with at least a portion of the first database table;
in response to receiving said DDL statement, creating a second database table having one or more physical properties of said first database table;
wherein said one or more physical properties define data organization within data blocks storing said first database table on persistent storage;
wherein said one or more physical properties include at least one of the following particular physical properties:
a physical column order between columns of said first database table within said data blocks of said first database table, and
a position within said data blocks for a column truncated from said first database table.

12. The one or more non-transitory computer-readable media of claim 11, wherein the DDL statement refers to a partition with sub-partitions, and the physical properties additionally include a partition criterion of the sub-partitions.

13. The one or more non-transitory computer-readable media of claim 11, wherein the set of instructions further comprises instructions which, when executed by the one or more hardware processors, cause:
prior to receiving the DDL statement, causing a first column in the first database table to be invisible; and
in response to receiving said DDL statement, creating the second database table with a second column that is invisible based on the first column being invisible.

14. The one or more non-transitory computer-readable media of claim 11 wherein the set of instructions further comprises instructions which, when executed by the one or more hardware processors, cause:
a first column in the first database table to be hidden; and
creating the second database table with a second column that is hidden based on the first column being hidden.

15. The one or more non-transitory computer-readable media of claim 11, wherein the set of instructions further comprises instructions which, when executed by the one or more hardware processors, cause:
prior to receiving the DDL statement, causing a first column in the first database table to be virtual; and
in response to receiving said DDL statement, creating the second database table with a second column that is virtual based on the first column being virtual.

16. The one or more non-transitory computer-readable media of claim 11, wherein the set of instructions further comprises instructions which, when executed by the one or more hardware processors, cause:
prior to receiving the DDL statement, causing a first column in the first database table to be encrypted; and
in response to receiving said DDL statement, creating the second database table with a second column that is encrypted based on the first column being encrypted.

17. A computing device comprising:
one or more processors; and
volatile memory with instructions to execute a database server instance that is configured to:
receive a DDL statement referring to a first database table and specifying to create a table for an exchange with at least a portion of the first database table;
in response to receiving said DDL statement, create a second database table having one or more physical properties of said first database table;
wherein said one or more physical properties define data organization within data blocks storing said first database table on persistent storage;
wherein said one or more physical properties include at least one of the following particular physical properties:
a physical column order between columns of said first database table within said data blocks of said first database table, and
a position within said data blocks for a column truncated from said first database table.

18. The computing device of claim 17, wherein at least one physical property of the first database table is different than a corresponding logical property of the first database table; wherein a logical property is a table property as exposed to an entity external to a relational database management system that accesses the first database table.

19. The computing device of claim 17, wherein the one or more processors are further configured to:
prior to receiving the DDL statement, change a logical column order in the first database table without changing the physical column order; and
in response to receiving said DDL statement, create the second database table with the same logical column order and physical column order as the first database table.

20. The computing device of claim 17, wherein the database server instance is further configured to:
prior to receiving the DDL statement, change how many rows are stored in a given data block without changing a particular extra-logical property indicating a number of rows in the given data block; and
in response to receiving said DDL statement, create the second database table with one or more of the same extra-logical properties as the first database table including the particular extra-logical property indicating the number of rows in the given data block.

21. The computing device of claim 17, wherein the DDL statement refers to a partition with sub-partitions; and wherein the database server instance is further configured to:
create the second database table with one or more of the same extra-logical properties as the first database table including a partition criterion of the sub-partitions.

* * * * *

UNITED STATES PATENT AND TRADEMARK OFFICE
CERTIFICATE OF CORRECTION

PATENT NO. : 10,657,116 B2
APPLICATION NO. : 15/228831
DATED : May 19, 2020
INVENTOR(S) : Baer et al.

Page 1 of 1

It is certified that error appears in the above-identified patent and that said Letters Patent is hereby corrected as shown below:

On the Title Page

Column 2, item (74) under Attorney, Agent, or Firm, Line 2, delete "LLLP" and insert -- LLP --, therefor.

In the Specification

In Column 4, Line 37, after "information" insert -- . --.

In Column 5, Line 58, delete "Proccessing" and insert -- Processing --, therefor.

In Column 7, Line 4, delete "rDMBS" and insert -- rDBMS --, therefor.

In Column 7, Line 26, after "statement" insert -- . --.

In Column 8, Line 35, delete "rDMBS" and insert -- rDBMS --, therefor.

In Column 16, Line 21, delete "there" and insert -- their --, therefor.

In the Claims

In Column 21, Line 56, in Claim 14, delete "claim 11" and insert -- claim 11, --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*